US008442936B2

(12) United States Patent
Bissantz

(10) Patent No.: US 8,442,936 B2
(45) Date of Patent: May 14, 2013

(54) SYSTEM FOR GENERATING A TABLE

(76) Inventor: Nicolas Bissantz, Nuremberg (DE)

( * ) Notice: Subject to any disclaimer, the term of this patent is extended or adjusted under 35 U.S.C. 154(b) by 1164 days.

(21) Appl. No.: 11/503,027

(22) Filed: Aug. 11, 2006

(65) Prior Publication Data
US 2008/0040372 A1 Feb. 14, 2008

(51) Int. Cl.
*G06F 17/30* (2006.01)
(52) U.S. Cl.
USPC ............ 707/603; 707/776; 707/804; 707/805
(58) Field of Classification Search ........................ None
See application file for complete search history.

(56) References Cited

U.S. PATENT DOCUMENTS

| | | | | |
|---|---|---|---|---|
| 5,359,724 | A * | 10/1994 | Earle ..................................... | 1/1 |
| 5,884,306 | A * | 3/1999 | Bliss et al. ........................ | 707/7 |
| 6,330,564 | B1* | 12/2001 | Hellerstein et al. ........... | 707/101 |
| 6,760,721 | B1* | 7/2004 | Chasen et al. ........................ | 1/1 |
| 6,976,212 | B2* | 12/2005 | Newman et al. ............. | 715/227 |
| 7,222,308 | B2* | 5/2007 | Sauermann et al. ........... | 715/833 |
| 7,461,077 | B1* | 12/2008 | Greenwood ................... | 707/102 |
| 7,730,428 | B1* | 6/2010 | Yehuda et al. ................. | 715/853 |
| 7,831,539 | B2* | 11/2010 | Folting et al. ................. | 707/600 |
| 2001/0047372 | A1* | 11/2001 | Gorelik et al. ................. | 707/514 |
| 2003/0050916 | A1* | 3/2003 | Ortega et al. .................... | 707/1 |
| 2003/0110187 | A1* | 6/2003 | Cardno et al. ............. | 707/104.1 |
| 2003/0120504 | A1* | 6/2003 | Kruk et al. ......................... | 705/1 |
| 2003/0128212 | A1* | 7/2003 | Pitkow .......................... | 345/440 |
| 2004/0039736 | A1* | 2/2004 | Kilmer et al. ..................... | 707/3 |
| 2004/0243593 | A1* | 12/2004 | Stolte et al. .................... | 707/100 |
| 2004/0243616 | A1* | 12/2004 | Benhase et al. ............... | 707/102 |
| 2007/0255745 | A1* | 11/2007 | Gargi ............................. | 707/102 |
| 2008/0295007 | A1* | 11/2008 | Bernhardt ..................... | 715/764 |

FOREIGN PATENT DOCUMENTS
EP 1462918 A1 * 9/2004

OTHER PUBLICATIONS

Williams, "Professional Visual Basic 6 Databases", Aug. 2002, "Wrox Press", pp. 562-563.*
Gregorio, Joe "Sparklines Generator", Published Aug. 22, 2005, Available at "http://www.bitworking.org/projects/sparklines", Accessed via "http://web.archive.org/web/20050822213250/bitworking.org/projects/sparklines" on Mar. 23, 2009.*

* cited by examiner

*Primary Examiner* — Christyann Pulliam
*Assistant Examiner* — Charles Adams
(74) *Attorney, Agent, or Firm* — Dilworth & Barrese, LLP.

(57) ABSTRACT

The present invention relates to a system for generating a table comprising generating means for generating a table which contains at least a column or line depicting one or more first categories and at least a column or line depicting first values associated with said first categories and wherein the system further comprises selecting means for selecting one of said first categories by a user and adding means for enlarging the table upon selection of a category by said selecting means, said adding means being adapted to enlarge the table by adding a new column or line which comprises second categories into which said selected first category may be subdivided as well as second values associated with said second categories and wherein said new column or line does not comprise categories into which non selected first categories may be subdivided.

18 Claims, 3 Drawing Sheets

Fig. 1

|  | Measures ... |
|---|---|
| Scenarios ... | ☐ Revenues |
| 110 ☐ Actual | 17,336,385 |
| 120 ☐ Plan | 21,121,824 |
| 130 ☐ Actual-Budget Dev. | -3,785,439 |
| 140 ☐ Actual-Budget Dev.% | -17.9 % |

Fig. 2

| Scenarios ... | Products ... | Sales Organization ... | Customers ... | Measures ... Revenues |
|---|---|---|---|---|
| Actual (116) | All Products (210) | All Sales Reps | North | 964,427 |
| | | | South | 15,275,902 |
| | | Sales Group A | North | 931,081 |
| | | | South | 6,408,996 |
| | | Sales Group B | North | 33,346 |
| | | | South | 8,866,906 |
| | Luxury Division (220) | All Sales Reps (310) | North | 0.04 |
| | | | South | 0.04 |
| | | Sales Group A (320) | North | 0.04 |
| | | | South | 0.04 |
| | | Sales Group B (330) | North | |
| | | | South | |
| | Custom made (230) | All Sales Reps | North | 119,991 |
| | | | South | 14,267,507 |
| | | Sales Group A | North | 86,644 |
| | | | South | 5,400,601 |
| | | Sales Group B | North | 33,346 |
| | | | South | 8,866,906 |
| | Standards (240) | All Sales Reps | North | 844,437 |
| | | | South | 1,008,395 |
| | | Sales Group A | North | 844,437 |
| | | | South | 1,008,395 |
| | | Sales Group B | North | |
| | | | South | |
| Plan (120) | All Products | All Sales Reps | North | 1,760,484 |
| | | | South | 17,925,135 |
| | | Sales Group A | North | 1,723,334 |
| | | | South | 8,041,333 |
| | | Sales Group B | North | 37,150 |
| | | | South | 9,883,802 |

100 / 200 / 300 / 400 / 500

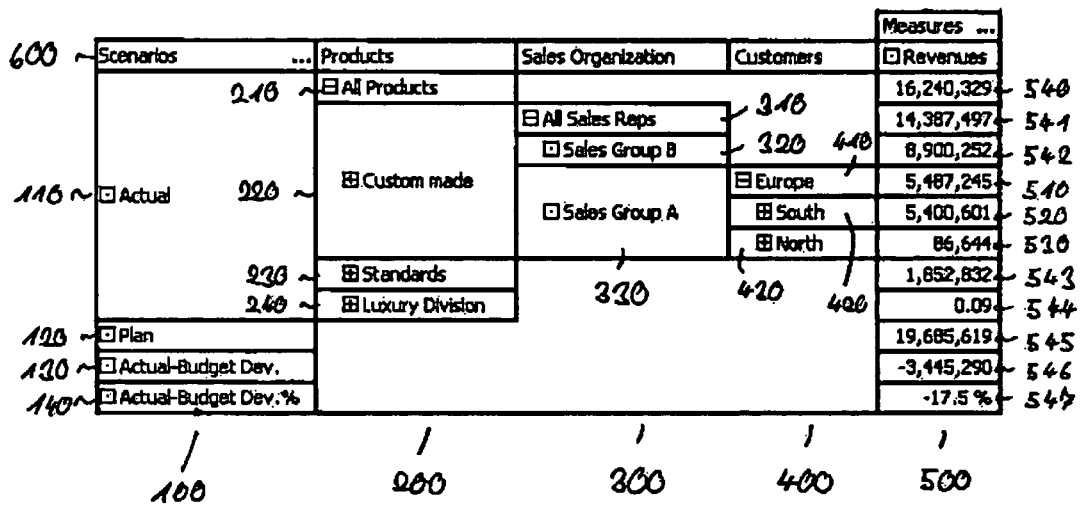

_US 8,442,936 B2_

SYSTEM FOR GENERATING A TABLE

BACKGROUND OF THE INVENTION

The present invention relates to a system for generating a table. The system comprises generating means for generating a table which contains at least a column or line depicting one or more first categories and at least a column or line depicting first values associated with said first categories. The system further comprises selecting means for selecting one of said first categories by a user and adding means for enlarging the table upon selection of a category by said selecting means, said adding means being adapted to enlarge the table by adding a new column or line which comprises second categories into which said selected first category may be subdivided as well as second values associated with said second categories. Such tables are known from the prior art and are called "pivot-tables".

One example of such table is shown in FIG. 2.

The table shown in FIG. 2 is composed of five columns having the reference numerals 100, 200, 300, 400, 500. In the present example shown in FIG. 2 the first column 100 comprises two categories 110, 120 which both may be subdivided in subcategories which are here called second categories. In the present example the first category 110 may be subdivided in four second categories which have the reference numerals 210, 220, 230, 240. As is shown in FIG. 2 each of these second categories 210, 220, 230, 240 may be further subdivided into third categories which for example in case of category 220 have the reference numeral 310, 320, 330. The table shown in FIG. 2 has been established starting from the table depicted in FIG. 1.

As is shown in FIG. 2 each time a further category is selected this further category is shown for all of the previous categories. In the present example shown in FIG. 2 column 300 contains third categories for all of the second categories represented in column 200. The same applies relating to the first and second, third and fourth, etc. columns. Thus, the table is becoming more and more complicated and space consuming which renders the representation of the table rather complex as may be easily gathered from FIG. 2. Further, representation of a table as shown in FIG. 2 requires a high amount of data which may lead to a comparatively slow assembly of the table on the screen.

SUMMARY OF THE INVENTION

It is therefore the object of the present invention to improve a system for generating a table so that the table contains all information desired by the user without unveiling the complexity of the prior art tables.

This object is solved by a system for generating a table. According to the present invention the system comprises adding means wherein a new created column or line does not comprise categories into which non selected first categories may be subdivided. Starting for example from the table shown in FIG. 1 the user selects category 110 which results in providing a new column 200 which contains only those second categories (in the present example shown in FIG. 3 four second categories 210, 220, 230, 240) with associated values. Contrary to the prior art, the means for generating the table do not provide second categories for those first categories which have not been selected. In the present example shown in FIG. 3 it is evident that no second categories are provided in the table for the first categories 120, 130, 140 which have not been selected by the user.

This concept in accordance to the present invention does of course not only apply for selecting a first category but also for selecting any further (second, third, fourth, etc.) category so that the table converges to the desired information and values as shown in FIG. 3.

The advantages of the present invention are not only that the graphical representation of the table is less complex than in the prior art but also that the amount of data required for representing the table is smaller so that the table may be generated with a higher speed.

In accordance to a further embodiment of the present invention as outlined above the adding means are adapted to further enlarge the table by adding one or more further columns or lines so that the above mentioned concept of course does not only apply for the first and second column but also for any further category of the second, third, fourth, etc. grade. The system may further comprise means for reducing the table by relatively removing non desired columns or lines from the table.

In accordance to a further embodiment of the present invention the table contains a line or column including the type of the depicted categories. In the present example this line is the first line of the table which is a brief description of the type of the depicted categories for example "product", "sales representatives", etc.

In accordance with a further embodiment of the present invention the values associated to the first and any further category are listed in one column or line of the table and are thus not distributed over different columns or lines. This is for example shown in FIG. 3. In this example column 500 is the only column which shows values related to the categories which are depicted in the table.

In accordance to a further embodiment of the present invention values of non selected categories are maintained in the table after selection of another category. For example, in FIG. 3 the category 120 has not been selected for a subdivision into second category. Accordingly, value 545 related to this category is maintained although the category 120 has not been selected for representing further subcategories.

In accordance to a further embodiment of the present invention the column or line which comprises second, third, fourth, etc. categories into which the respective previous category has been subdivided comprises a category covering all further of said categories. In the present example category 210 is the overall term ("all products") which covers all of the categories 220, 230, 240 which are listed below and which fall under the overall term depicted as category 210.

In accordance with a preferred embodiment of the invention the system further comprises means for generating a sparkline wherein at least one, some or all of the depicted categories are provided with a sparkline showing the number of categories into which the depicted category may be subdivided as well as the relation of values associated with said categories. A sparkline for example may comprise horizontal or vertical bars each of the bars representing a numerical value. A sparkline is a word sized graphic which provides a lot of information in a small space. For example in the table shown in FIG. 3 a sparkline may be provided beneath or beside the term of category 220 for providing a graphical representation of categories 310, 320, 330 into which the category 220 may be subdivided upon selection by the user.

A sparkline provides a very helpful means for immediately depicting the distribution of categories of a selected item.

It is further advantageous if the system further comprises means for selecting a bar of a sparkline and means for depicting the value on which the selected bar of the sparkline is based. Such selection may be made by moving the mouse pointer to the respective bar of the sparkline and by showing on the screen the value on which the selected bar of the sparkline is based. Further, it may be possible that the portion of the value represented by the bar of the sparkline relative to the sum of values on which the sparkline is based is depicted. For example this portion is depicted as a percentage value.

In accordance to a further embodiment of the invention the generating means for generating the sparkline are adapted to allow display only of those values which contribute to the sum of values to a predetermined minimum extent. Accordingly, values which contribute only to a very small extent are not depicted in the sparkline since it is assumed that those values are of lower interest to the user than others.

In accordance to a further embodiment the generating means for generating a sparkline are adapted to disallow display of those values which are smaller than the next larger data by a predetermined amount. Accordingly, if a value differs from the next larger value by a predetermined amount this value is not shown in the sparkline for the same reason as given above.

In accordance to a further embodiment of the present invention a category may be subdivided into different types of categories. In accordance to this embodiment of the invention the adding means are adapted to automatically choose the type of categories based upon a predetermined or changeable criterion. For example if the category "product" may be subdivided into different further types of categories such as "sales channel", "sales area", "sales representatives", etc., the present invention is adapted to automatically chose the suitable type of category which is depicted upon selection. Said criterion may be the spread of values associated with said type of categories. If for example the spread of values is the largest in the type of categories "sales area" whereas only a little spread of values is available with the type of categories "sales channel" the system automatically chooses the category "sales area" at not "sales channel" upon selection of the category "product".

The spread of values may be the standard deviation or variance of the values of the respective category. Of course, also other parameters which reflect the spread of the values are conceivable as a measure for selecting a category.

In accordance to a further embodiment of the present invention the adding means are adapted to chose this type of categories the values of which having the highest spread of values. Further, the adding means may be adapted to add types of categories in an order so that categories having a higher spread of data are chosen prior to those categories having a lower spread of data. Accordingly, upon repeated selection of categories those categories are added first in the table having a higher spread in contrast to those having a lower spread of underlying values.

BRIEF DESCRIPTION OF THE DRAWINGS

Further advantages of the present invention may become evident from the drawing.

FIGS. 1 and 3 shown an example of the present invention.

FIG. 2 shows a table according to the prior art.

DESCRIPTION OF THE PREFERRED EMBODIMENTS

Starting from FIG. 1 the table depicted on a screen for example of a computer, or a mobile device has four first categories 110, 120, 130, 140 in a first column 100 as well as values associated with those first categories and being depicted in column 500.

If the user is interested to know how the value for category 110 is composed he selects for example by using the computer mouse the category 110 and then obtains a table having a further column 200 (FIG. 3) in which the category 110 is subdivided in four second categories 210, 220, 230, 240 wherein each of those second categories is assigned a value in column 500. Column 500 further contains values of those categories 120, 130, 140 which have not been selected by the user for subdivision.

If the user further wants to have more information referring to the category 220 he selects this category 220 for example by moving the mouse pointer to the respective portion of the table and activating the mouse and then obtains a table having a third column 300 in which the categories 310, 320, 330 which are subcategories of category 220 are shown.

The user may then select category 330 which leads to the generation of a further column 400 having the categories 410, 420, 430 which are subcategories to category 330. Column 500 in any case shows the values 540-547 of non selected categories as well as of those categories 410, 420, 430 which have been selected lastly. These values are depicted as values 510, 520, 530.

One major advantage of the present invention is that the table shown to the user is less complex than prior art tables, nevertheless contains all required information and further may be quickly generated due to the fact that a less amount of data is necessary for representing the table on the screen.

The invention claimed is:

1. A system for generating a table comprising:
   a computer configured to generate a table for data which includes at least a column or line depicting one or more first categories and at least a column or line depicting first values associated with said first categories, the first categories relating to a first dimension of the data, and
   a user interface configured to receive a selection from a user selecting one of said first categories
   the computer configured to enlarge the table upon selection of one of the one or more first categories by the user, said computer being configured to enlarge the table by adding a new column or line which comprises second categories into which said selected one of the first categories may be subdivided as well as second values associated with said second categories, the second categories relating to a second dimension of the data distinct from the first dimension,
   said new column or line does not comprise categories into which non selected first categories may be subdivided;
   wherein the first category may be subdivided into a plurality of different types of second categories, each of said second categories relating to a second dimension of the data distinct from and not a subspecies of the first dimension;
   wherein said computer is configured to automatically choose one type of the second categories out of said plurality of different types of second categories based on said second values;
   wherein the computer is further configured to generate a sparkline, at least one of the depicted first categories being provided with a sparkline showing a number of said second categories into which the depicted first category may be sub-divided as well as a relation of values associated with said second categories; and
   wherein the computer is further configured to allow display only of the values associated with said second categories which contribute to a sum of values to a predetermined minimum extent.

2. The system according to claim 1 wherein said user interface is further configured to receive a selection from a user selecting one of said second categories and said computer is configured to further enlarge the table by adding one or more further columns or lines which comprises third categories into which said selected second category may be subdivided as well as third values associated with said third categories, and said further column or line does not comprise categories into which non selected categories may be subdivided.

3. The system according to claim 1, wherein the table contains an additional line or column including the type of the depicted categories.

4. The system according to claim 1, wherein the values associated to the first and any further category are listed in one column or line of the table.

5. The system according to claim 1, wherein values of non selected categories are maintained in the table after selection of another of the one or more first categories.

6. The system according to claim 1, wherein the new column or line which comprises the second categories into which said selected first category has been subdivided comprises a category covering all further of said second categories.

7. The system according to claim 1, wherein the user interface is further configured to receive a selection of a bar of a sparkline and the computer is further configured to depict the value on which the selected bar of the sparkline is based.

8. The system according to claim 7, wherein the portion of the value represented by the bar of the sparkline relative to the sum of values on which the sparkline is based is depicted.

9. The system according to claim 1, wherein the one type is chosen based on a spread of values associated with the second categories.

10. The system according to claim 1, wherein the one type is chosen based on a highest spread of values.

11. The system according to claim 9, wherein the computer is configured to add types of categories in an order so that categories having a higher spread of values are chosen prior to those categories having a lower spread of values.

12. The system according to claim 10, wherein the computer is configured to add types of categories in an order so that categories having a higher spread of values are chosen prior to those categories having a lower spread of values.

13. The system according to claim 2, wherein the table contains an additional line or column including the type of the depicted categories.

14. The system according to claim 13, wherein the values associated to the first and any further category are listed in one column or line of the table.

15. A system for generating a table for data, the system comprising:

a computer configured to generate a table for data on a display, the table including at least a column or line depicting one or more first categories and at least a column or line depicting first values associated with said first categories, the first categories relating to a first dimension of the data and a user interface configured to receive a selection from a user selecting one of said first categories;

the computer configured to enlarge the table upon selection of the one of the first categories, the computer configured to enlarge the table by adding a new column or line which comprises second categories into which said selected one of the first categories may be subdivided as well as second values associated with said second categories, said new column or line does not comprise categories into which non selected first categories may be subdivided;

wherein the first category may be subdivided into a plurality of the second categories, each of said second categories relating to a second dimension of the data distinct from and not a subspecies of the first dimension;

wherein said computer is configured to automatically choose one type of the second categories out of said plurality of different types of second categories based on said second values;

wherein the computer is further configured to generate a sparkline, at least one of the depicted first categories being provided with a sparkline showing a number of said second categories into which the depicted first category may be sub-divided as well as a relation of values associated with said second categories; and wherein the computer is further configured to allow display only of the values associated with said second categories which contribute to a sum of values to a predetermined minimum extent.

16. The system according to claim 15, wherein the user interface further is configured to enable a user to select a bar of the sparkline and the computer is configured to depict the value on which the selected bar of the sparkline is based.

17. The system according to claim 16, wherein the portion of the value represented by the bar of the sparkline relative to the sum of values on which the sparkline is based is depicted.

18. A system for generating a table comprising:

a computer configured to generate a table for data which includes at least a column or line depicting one or more first categories and at least a column or line depicting first values associated with said first categories, the first categories relating to a first dimension of the data, and a user interface configured to receive a selection from a user selecting one of said first categories;

the computer configured to enlarge the table upon selection of one of the one or more of the first categories by the user, said computer being configured to enlarge the table by adding a new column or line which comprises second categories into which said selected one of the first categories may be subdivided as well as second values associated with said second categories, the second categories relating to a second dimension of the data distinct from the first dimension, said new column or line does not comprise categories into which non selected first categories may be subdivided;

wherein the first category may be subdivided into a plurality of different types of second categories, each of said second categories relating to a second dimension of the data distinct from and not a subspecies of the first dimension;

wherein said computer is configured to automatically choose one type of the second categories out of said plurality of different types of second categories based on said second values;

wherein the computer is further configured to generate a sparkline, at least one of the depicted first categories being provided with a sparkline showing a number of said second categories into which the depicted first category may be sub-divided as well as a relation of values associated with said second categories; and wherein the computer is further configured to disallow display of the values associated with said second categories which are smaller than the next larger data by a predetermined amount.

* * * * *